United States Patent
Heo et al.

(10) Patent No.: US 8,958,366 B2
(45) Date of Patent: Feb. 17, 2015

(54) REDUCING BLIND DECODINGS FOR COMMUNICATIONS USING CARRIER AGGREGATION

(75) Inventors: Youn Hyoung Heo, Suwon (KR); Sean McBeath, Keller, TX (US); Andrew Mark Earnshaw, Kanata (CA); Zhijun Cai, Euless, TX (US); Mo-Han Fong, Ottawa (CA); Hua Xu, Ottawa (CA)

(73) Assignee: BlackBerry Limited, Waterloo, Ontario (CA)

(*) Notice: Subject to any disclaimer, the term of this patent is extended or adjusted under 35 U.S.C. 154(b) by 207 days.

(21) Appl. No.: 13/457,294

(22) Filed: Apr. 26, 2012
(Under 37 CFR 1.47)

(65) Prior Publication Data

US 2013/0016655 A1    Jan. 17, 2013

Related U.S. Application Data

(63) Continuation of application No. PCT/US2010/054842, filed on Oct. 29, 2010.

(60) Provisional application No. 61/256,839, filed on Oct. 30, 2009.

(51) Int. Cl.
| | | |
|---|---|---|
| *H04W 4/00* | (2009.01) | |
| *H04L 5/00* | (2006.01) | |
| *H04L 27/26* | (2006.01) | |

(52) U.S. Cl.
CPC .............. *H04L 5/0053* (2013.01); *H04L 5/001* (2013.01); *H04L 5/0091* (2013.01); *H04L 27/2602* (2013.01)
USPC ........... 370/328; 370/252; 370/329; 370/330; 370/338

(58) Field of Classification Search
CPC ....................................................... H04L 5/001
USPC ......................... 370/252, 328, 329, 330, 338
See application file for complete search history.

(56) References Cited

U.S. PATENT DOCUMENTS

| | | | |
|---|---|---|---|
| 7,260,405 B2 * | 8/2007 | Kim et al. ................... | 455/452.2 |
| 8,009,606 B2 | 8/2011 | Seo et al. | |
| 8,239,721 B2 | 8/2012 | Pelletier et al. | |

(Continued)

FOREIGN PATENT DOCUMENTS

| | | |
|---|---|---|
| CN | 101505498 A | 8/2009 |
| CN | 101541063 A | 9/2009 |

OTHER PUBLICATIONS

3GPP TSG-WG2 Meeting #67bis; "Agreements on Carrier Aggregation"; R2-096292; Miyazaki, Japan; Oct. 12-16, 2009; 6 pages.

(Continued)

*Primary Examiner* — Andrew Lai
*Assistant Examiner* — Andrew C Lee
(74) *Attorney, Agent, or Firm* — Conley Rose, P.C.; J. Robert Brown, Jr.

(57) ABSTRACT

A method and apparatus for transmitting downlink control information when carrier aggregation is being used, by determining at least one downlink control information (DCI) format for a first carrier and at least once DCI format for a second carrier; and including padding in at least one DCI format corresponding to the second carrier such that the DCI format size of the padded DCI format equals the DCI format size of a DCI format corresponding to the first carrier.

29 Claims, 9 Drawing Sheets

(56) References Cited

U.S. PATENT DOCUMENTS

| | | | |
|---|---|---|---|
| 8,379,581 B2 | 2/2013 | Imamura | |
| 8,401,542 B2* | 3/2013 | Chung et al. | 455/423 |
| 8,537,724 B2 | 9/2013 | Love et al. | |
| 2009/0088148 A1 | 4/2009 | Chung et al. | |
| 2009/0239568 A1* | 9/2009 | Bertrand et al. | 455/522 |
| 2009/0300456 A1 | 12/2009 | Pelletier et al. | |
| 2009/0305698 A1 | 12/2009 | Zhang et al. | |
| 2009/0307554 A1 | 12/2009 | Marinier et al. | |
| 2010/0034303 A1 | 2/2010 | Damnjanovic et al. | |
| 2010/0080187 A1* | 4/2010 | Papasakellariou et al. | 370/329 |
| 2010/0188965 A1* | 7/2010 | Cheng et al. | 370/203 |
| 2010/0195614 A1* | 8/2010 | Nimbalker et al. | 370/330 |
| 2010/0227569 A1 | 9/2010 | Bala et al. | |
| 2010/0232373 A1* | 9/2010 | Nory et al. | 370/329 |
| 2010/0238984 A1* | 9/2010 | Sayana et al. | 375/219 |
| 2010/0322158 A1 | 12/2010 | Lee et al. | |
| 2011/0044239 A1 | 2/2011 | Cai et al. | |

OTHER PUBLICATIONS

3GPP TSG-RAN WG2 Meeting #67bis; "LS on the Capability of Search on the Secondary Carrier"; R2-096295; Miyazaki, Japan; Oct. 12-16, 2009; 1 page.
3GPP TSG RAN WG2 Meeting #67-bis; "Introduction of UE Measurement Capability on Frequency Adjacent to Infra-Frequency"; R2-096045; Miyazaki, Japan; Oct. 12-16, 2009; 15 pages.
3GPP TSG-RAN2 #67bis Meeting; "The Need for Additional Activation Procedure in Carrier Aggregation"; R2-095874; Miyazaki, Japan; Oct. 12-16, 2009; 4 pages.
3GPP TSG RAN WG2 #67bis; "Initial State for the Secondary Carrier"; R2-095718; Miyazaki, Japan; Oct. 12-16, 2009; 2 pages.
3GPP TSG RAN2 Meeting #67bis; "Component Carrier Configuration/Activation for Carrier Aggregation"; R2-095576; Miyazaki, Japan; Oct. 12-16, 2009; 3 pages.
3GPP TSG RAN WG1 Meeting #57bis; "Benefits of Carrier Indicator on Multi-Channel ACK/NACK Transmission"; R1-092786; Los Angeles, CA, USA; Jun. 29-Jul. 3, 2009; 3 pages.
3GPP TSG RAN WG1 Meeting #57bis; "Benefits of Carrier Indicator on Multi-Channel ACK/NACK Transmission"; R1-092846; Los Angeles, CA, USA; Jun. 29-Jul. 3, 2009; 3 pages.
3GPP TSG RAN WG1 #58bis Meeting; "Discussion of Carrier Indicator Signalling in Carrier Aggregation Scenario"; R1-09-3767; Miyazaki, Japan; Oct. 12-16, 2009; 3 pages.
3GPP TSG RAN WG1 #58bis; "Carrier Indicator in LTE-A"; R1-094129; Miyazaki, Japan; Oct. 12-16, 2009; 2 pages.
3GPP TSG RAN WG1 #58bis; "Configuration and Activation of Carrier Indicator in PDCCH for Multiple Carrier Aggregation"; R1-094161; Miyazaki, Japan; Oct. 12-16, 2009; 6 pages.
3GPP TSG RAN WG1 #58bis; "Interpreting the Carrier Indicator Field"; R1-094206; Miyazaki, Japan; Oct. 12-16, 2009; 3 pages.
3GPP TSG RAN WG1 #58bis; "Configuration and Activation of Carrier Indicator in PDCCH for Multiple Carrier Aggregation"; R1-094353; Miyazaki, Japan; Oct. 12-16, 2009; 6 pages.
Office Action dated Apr. 23, 2014; U.S. Appl. No. 13/457,313, filed Apr. 26, 2012; 30 pages.
PCT International Search Report; Application No. PCT/US2010/054842; Apr. 21, 2011; 3 pages.
PCT Written Opinion of the International Searching Authority; Application No. PCT/US2010/054842; Apr. 21, 2011; 5 pages.
3GPP TSG-RAN WG1 Meeting #58bis; "DCI Format and Blind Decoding for LTE-Advanced"; R1-093941; Miyazaki, Japan; Oct. 12-16, 2009; 5 pages.
3GPP TSG RAN WG1 #58; "Control Signaling for LTE Rel-9 Enhanced DL Transmission"; R1-093408; Shenzhen, China; Aug. 24-28, 2009; 7 pages.
3GPP TSG RAN WG1 #58; "Considerations on Alternative Ways of Implementing DCI Formats for LTE-Advanced"; R1-093318; Shenzhen, China; Aug. 24-28, 2009; 2 pages.
3GPP TSG RAN WG1 Meeting #58; "Way Forward on PDCCH for Bandwidth Extension in LTE-A"; R1-093699; Shenzhen, China; Aug. 24-28, 2009; 2 pages.
3GPP TSG-RAN WG1 Meeting #58; "Component Carrier Indication Scheme for Carrier Aggregation"; R1-093465; Shenzhen, China; Aug. 24-28, 2009; 3 pages.
3GPP TR 36.814 V9.0.0; 3rd Generation Partnership Project; Technical Specification Group Radio Access Network; Evolved Universal Terrestrial Radio Access (E-UTRA); Further Advancements for E-UTRA Physical Layer Aspects; Release 9; Mar. 2010; 104 pages.
3GPP TS 36.212 V8.7.0; 3rd Generation Partnership Project; Technical Specification Group Radio Access Network; Evolved Universal Terrestrial Radio Access (E-UTRA); Multiplexing and Channel Coding; Release 8; May 2009; 60 pages.
3GPP TS 36.213 V8.8.0; 3rd Generation Partnership Project; Technical Specification Group Radio Access Network; Evolved Universal Terrestrial Radio Access (E-UTRA); Physical Layer Procedures; Release 8; Sep. 2009; 77 pages.
PCT International Search Report; Application No. PCT/US2010/054849; Mar. 31, 2011; 3 pages.
PCT Written Opinion of the International Searching Authority; Application No. PCT/US2010/054849; Mar. 31, 2011; 7 pages.
3GPP TSG RAN WG1 Meeting #58bis; "Blind Decoding for Carrier Aggregation"; R1-094117; Miyazaki, Japan; Oct. 12-16, 2009; 3 pages.
3GPP TSG RAN WG1 Meeting #58; "Carrier Indication for Carrier Aggregation"; R1-093296; Shenzhen, China; Aug. 24-28, 2009; 4 pages.
3GPP TSG RAN1 #57bis; "PDCCH Design for Carrier Aggregation and Post Rel-8 Features"; R1-092641; Los Angeles, USA; Jun. 29-Jul. 3, 2009; 5 pages.
3GPP TSG RAN WG1 Meeting #58; "Issues on Cross Carrier Scheduling"; R1-093531; Shenzhen, China; Aug. 24-28, 2009; 3 pages.
PCT International Search Report; Application No. PCT/US2010/054848; Apr. 28, 2011; 5 pages.
PCT Written Opinion of the International Searching Authority; Application No. PCT/US2010/054848; Apr. 28, 2011; 4 pages.
Earnshaw, Andrew Mark, et al.; U.S. Appl. No. 13/457,313, filed Apr. 26, 2012; Title: Downlink Cntrol Information Set Switching when Using Carrier Aggregation.
Canadian Office Action; Application No. 2,779,297; Aug. 22, 2013; 3 pages.
Canadian Office Action; Application No. 2,779,299; Nov. 15, 2013; 4 pages.
Earnshaw, Andrew Mark, et al.; U.S. Appl. No. 14/292,458, filed May 30, 2014; Title: Downlink Control Information Set Switching When Using Carrier Aggregation.
Notice of Allowance dated May 9, 2014; U.S. Appl. No. 13/457,313, filed Apr. 26, 2012; 14 pages.
Office Action dated Aug. 14, 2014; U.S. Appl. No. 14/292,458, filed May 30, 2014; 28 pages.
Chinese Office Action as Received in Co-pending Application No. 201080060288.1 on Jun. 4, 2014; 6 pages. (No English translation available).
Chinese Office Action as Received in Co-Pending Application No. 201080060290.9 on Aug. 5, 2014; 5 pages.(No English translation available).

* cited by examiner

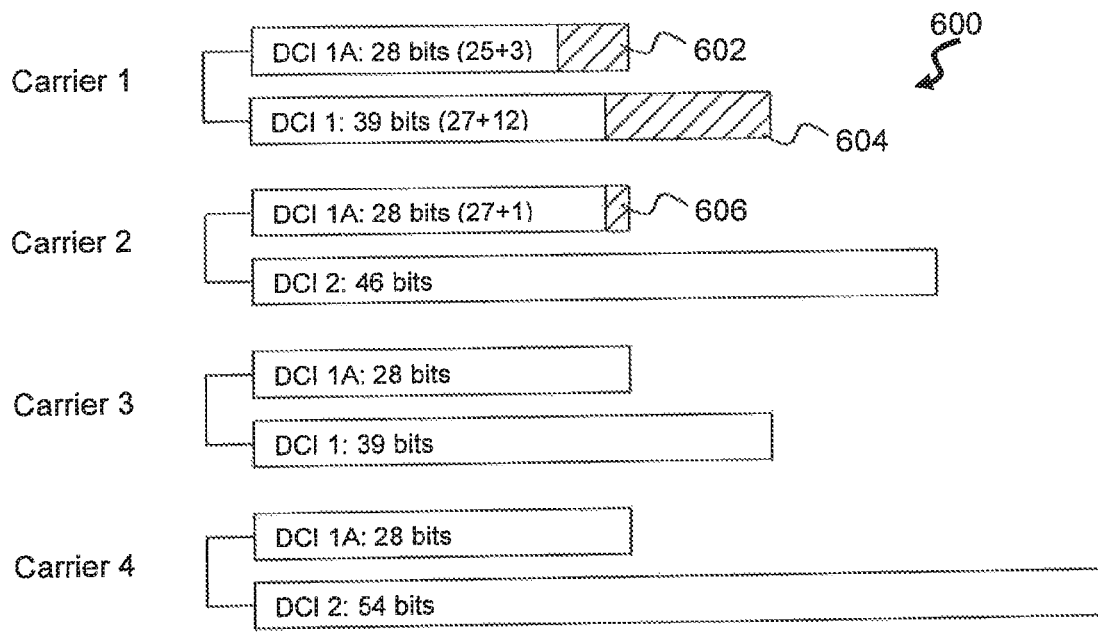
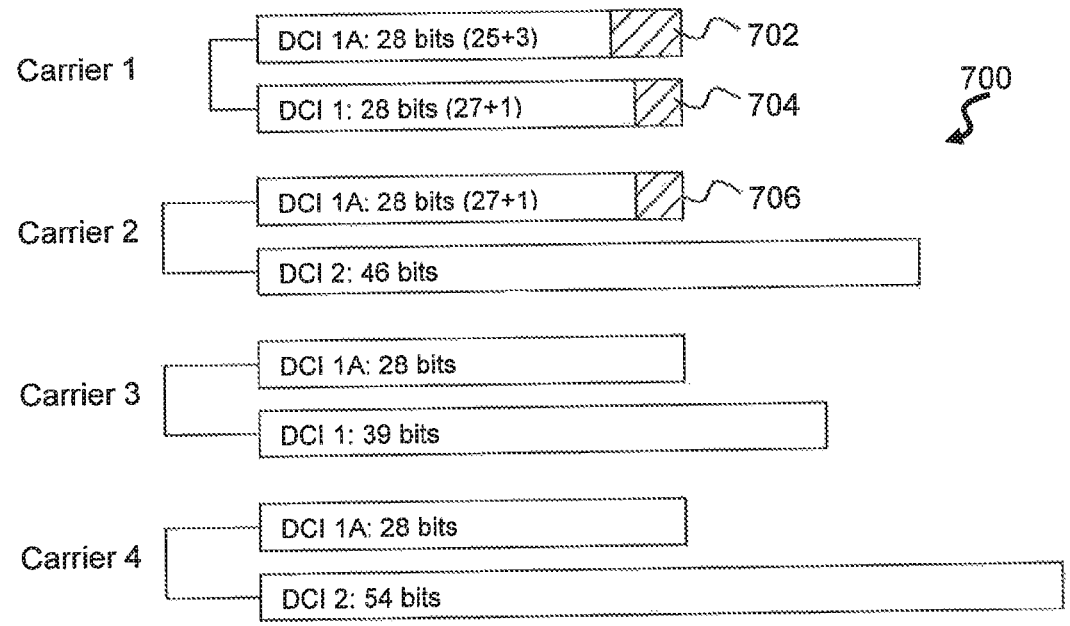

US 8,958,366 B2

REDUCING BLIND DECODINGS FOR COMMUNICATIONS USING CARRIER AGGREGATION

CROSS-REFERENCE TO RELATED APPLICATIONS

This application is a continuation application of International Application No. PCT/US2010/054842 filed Oct. 29, 2010, entitled "Reducing Blind Decodings For Communications Using Carrier Aggregation," claiming priority from U.S. Provisional Patent Application No. 61/256,839 filed Oct. 30, 2009, entitled "Reducing Blind Decodings For Communications Using Carrier Aggregation," which are incorporated by reference herein as if reproduced in their entirety.

BACKGROUND

As used herein, the terms "user equipment" ("UE"), "mobile station" ("MS"), and "user agent" ("UA") might in some cases refer to mobile devices such as mobile telephones, personal digital assistants, handheld or laptop computers, and similar devices that have telecommunications capabilities. The terms "MS," "UE," "UA," "user device," and "user node" may be used synonymously herein. A UE might include components that allow the UE to communicate with other devices, and might also include one or more associated removable memory modules, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long-Term Evolution (LTE) and LTE-Advanced (LTE-A). For example, an LTE or LTE-A system might be an Evolved Universal Terrestrial Radio Access Network (E-UTRAN) and include an E-UTRAN node B (or eNB), a wireless access point, a relay node, or a similar component rather than a traditional base station. As used herein, the term "access node" refers to any component of the wireless network, such as a traditional base station, a wireless access point, relay node, or an LTE or LTE-A node B or eNB, that creates a geographical area of reception and transmission coverage allowing a UE or a relay node to access other components in a telecommunications system. In this document, the term "access node" and "access device" may be used interchangeably, but it is understood that an access node may comprise a plurality of hardware and software.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 is a diagram illustrating an example of DCI formats used in each carrier after applying padding bits, in accordance with an embodiment of the disclosure.

FIG. 7 is a diagram illustrating an example of DCI formats used in each carrier after applying padding bits, in accordance with an embodiment of the disclosure.

DETAILED DESCRIPTION

Figure 1:
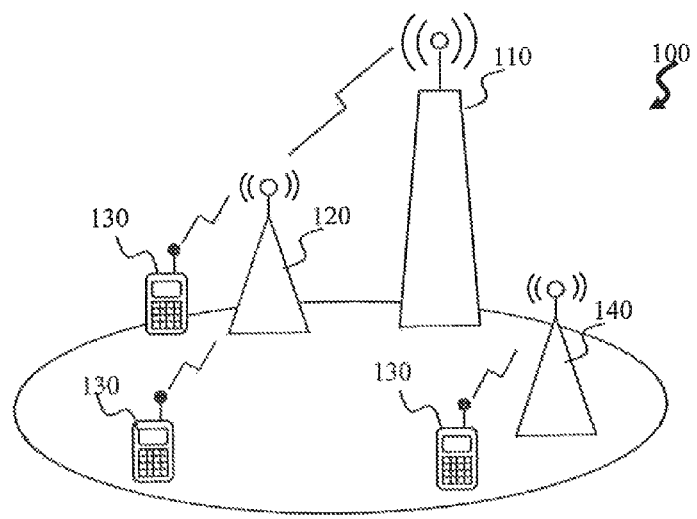
FIG. 1 is a diagram of a communication system, according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used throughout the specification, claims, and Figures, the following acronyms have the following definitions. Unless stated otherwise, all terms are defined by and follow the standards set forth by the Third Generation Partnership Program (3GPP) technical specifications.

"CA" is defined as "Carrier Aggregation."
"CCE" is defined as "Control Channel Element."
"CI" is defined as "Carrier Indicator."
"CIF" is defined as "Carrier Indicator Field."
"DCI" is defined as "Downlink Control Information."
"eNB" is defined as "E-UTRAN Node B."
"EUTRA" is defined as "Evolved Universal Terrestrial Radio Access."

"EUTRAN" is defined as "E-UTRA Network."
"FDD" is defined as "Frequency Division Duplexing."
"LTE" is defined as "Long Term Evolution."
"LTE-A" is defined as "LTE-Advanced."
"RAN" is defined as "Radio Access Network."
"RB" is defined as "Resource Block."
"Release" followed by a number refers to a version number of the 3GPP specifications.
"RRC" is defined as "Radio Resource Control."
"PDCCH" is defined as "Physical Downlink Control Channel."
"PDSCH" is defined as "Physical Downlink Shared Channel."
"PUSCH" is defined as "Physical Uplink Shared Channel".
"PCFICH" is defined as "Physical Control Format Indicator Channel."
"TDD" is defined as "Time Division Duplexing."
"Tx" is defined as "Transmission."
"UMTS" is defined as "Universal Mobile Telecommunications System."

The embodiments described herein relate to reducing the number of blind decodings used or required when the carrier aggregation technique described herein is in use. As described below, the number of blind decodings may become very large, resulting in an undesirable amount of resources being used and waste of the UE's battery power.

For normal (Release-8 compliant) transmissions, a UE may search for two DCI formats in each of 16 possible PDCCH candidates in the UE-specific search space and 6 PDCCH candidates in the common search space. This normal search results in a maximum of 44 blind decodes per carrier. However, when the carrier aggregation technique is used, each downlink carrier may contain its own PDCCH. For this reason, when carrier aggregation is used, the UE may be required to perform a maximum of 44N blind decodes, where N is the number of currently active carriers.

At least four different techniques are provided for reducing the number of blind decodings when carrier aggregation is used. For example, the number of blind decodings may be reduced relative to the value of 44N.

In a first embodiment, to avoid an excessively large number of padding bits, this padding method might only be applied to certain types of DCI formats. One possible method is that padding is applied in DCI formats which use the compact resource allocation method. By padding the DCI formats, the maximum number of blind decodings that is necessary is reduced by reducing the number of different DCI format sizes. This embodiment is described further below.

In a second embodiment, the eNB may signal one or more reference sizes to be used to determine the number of padding bits for particular DCI formats. When the UE receives the reference size(s), the UE includes padding for DCI formats having a smaller bit length such that each DCI format will have the same size as one of the reference sizes. By specifying a reference size to determine the number of padding bits, the number of blind decodings that is necessary is reduced by reducing the number of different DCI format sizes. This embodiment is described further below.

Additionally, in a third embodiment, an implicit method may be used to reduce the number of blind decodings when carrier aggregation is used. In the implicit method, the UE determines the reference size of each DCI format based on an implicit rule. One possible rule is that the reference size is the largest DCI format size among the DCI formats for which the padding bit difference is smaller than a threshold. By using a rule to derive the number of padding bits, the number of blind decodings that is necessary is reduced by reducing the number of different DCI format sizes. This embodiment is described further below.

In a fourth embodiment, the eNB may establish separate search spaces for each set of DCI format sizes which correspond to one or more carriers. This technique avoids padding between different DCI format sizes. This fourth technique also reduces the probability of blocking on the PDCCH by increasing the UE specific search space. Even though the UE search space is increased, the maximum number of blind decodings does not increase because the number of PDCCH candidates for each DCI format size remains the same. This embodiment is described further below.

The above four embodiments are exemplary only. Additional embodiments and examples for reducing the number of blind decodings when carrier aggregation is used are provided below. Although described as providing certain advantages, such as reducing the number of blind decodings, the systems and methods disclosed herein are not so limited and may provide other advantages or serve other purposes. Thus, the embodiments described herein address these and other issues.

FIG. 1 illustrates an embodiment of a RAN 100, which may be a LTE or LTE-A network as described in the 3GPP specifications. FIG. 1 is exemplary and may have other components or arrangements in other embodiments. In an embodiment, RAN 100 may be an LTE-A network and may include one or more access nodes 110 and 140, one or more relay nodes (RNs) 120, and one or more UEs 130. FIG. 1 shows a second access node 140 being present. Either access node 110 or 140 may be an eNB, a base station, or other component that promote network access for the UEs 130. UEs 130 may communicate with each other via RAN 100, may communicate with the various components of the RAN 100 shown, and may also communicate with other components not shown. RAN 100 may enable a wireless telecommunications system.

Figure 2:
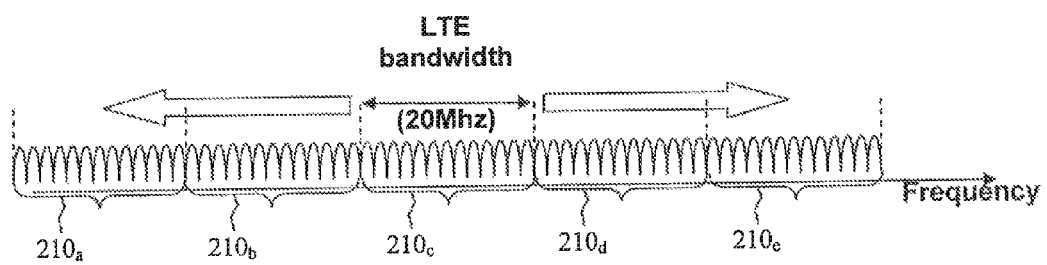
FIG. 2 is a diagram illustrating aggregation of carriers, in accordance with an embodiment of the disclosure.

FIG. 2 is a diagram illustrating aggregation of carriers, in accordance with an embodiment of the disclosure. In LTE-A, carrier aggregation might be used in order to support wider transmission bandwidths and hence increase the potential peak data rate, for example, to meet LTE-A requirements. In carrier aggregation, multiple component carriers are aggregated and can be allocated in a subframe to a UA, as shown in FIG. 2. In this example, each component carrier 210a, 210b, 210c, 210d, and 210e has a width of about 20 MHz. The total system bandwidth is about 100 MHz. It is noted that other bandwidths such as 10 MHz can also be used by a component carrier. The UE may receive or transmit on a multiple, such as up to five, of component carriers, depending on the UE's capabilities. In addition, depending on the deployment scenario, carrier aggregation may occur with carriers located in the same frequency band and/or carriers located in different bands. For example, one carrier may be located at 2 GHz and a second aggregated carrier may be located at 800 MHz.

In LTE-A, one of the issues associated with carrier aggregation is the design of the PDCCH. Two options currently exist. Option 1 is that the PDCCH is transmitted on the same carrier as the carrier on which the corresponding PDSCH is transmitted, and option 2 shows that the PDCCH can be transmitted on a carrier different from the carrier on which at least one of the corresponding PDSCHs is transmitted.

In the first option, the PDCCH on a component carrier assigns PDSCH resources on the same component carrier and PUSCH resources on a single linked uplink component carrier. In this case, no carrier indicator field is present. That is, the Release-8 PDCCH structure may continue to be used with the same coding, same CCE-based resource mapping, and DCI formats.

Regarding the second option, the PDCCH on a component carrier can assign PDSCH or PUSCH resources in one of multiple component carriers using the carrier indicator field. In this case, Release-8 DCI formats are extended with a 1-3 bit explicit carrier indicator field. In one embodiment, the length of the carrier indicator field could be semi-statically signaled by the RRC signaling. The remaining Release-8 PDCCH structure is reused with the same coding and same CCE-based resource mapping. The embodiments described herein provide solutions and UE procedures to resolve various issues, including but not limited to, those related to the introduction of the explicit CIF.

Figure 3:
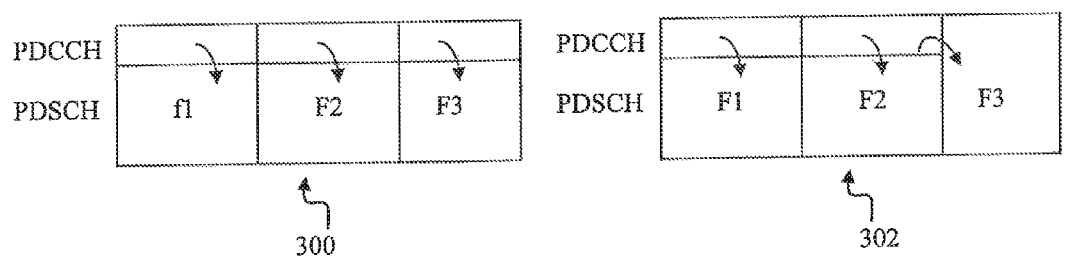
FIG. 3 is a diagram illustrating alternative implementations of carrier aggregation, in accordance with an embodiment of the disclosure.

FIG. 3 is a diagram illustrating alternative implementations of carrier aggregation, in accordance with an embodiment of the disclosure. FIG. 3 shows the above two alternatives. The first alternative, shown at arrow 300, shows the PDCCH is transmitted on the same carrier as the carrier on which the corresponding PDSCH is transmitted. The second alternative, shown at arrow 302, shows that the PDCCH can be transmitted on a carrier different from the carrier on which at least one of the corresponding PDSCHs is transmitted. For this second alternative, a CIF may be used to indicate the carrier on which the appropriate PDSCH or PUSCH is allocated. The CIF requires additional signaling bits that are added to a DCI, for either a downlink resource allocation or uplink resource grant, to allow PDCCH signaling on a PDCCH monitoring carrier to refer to resources on a different carrier.

The embodiments described herein relate, among other things, to reducing the number of blind decodings used or required when the carrier aggregation technique described above is in use. A feature of using an explicit CIF is that the CIF allows an eNB to indicate the carrier on which the corresponding PDSCH is transmitted. However, the CIF does not provide a reduction of the number in blind decodings when different DCI format sizes are used for each carrier. For example, the number of blind decodings may be an issue in the case where two carriers are aggregated, wherein one carrier is configured in transmission mode 1 and the other carrier is configured in transmission mode 3 of LTE Rel-8 system. This issue might also include the UE monitoring a single PDCCH, denoted the PDCCH monitoring carrier, for resource allocations corresponding to both carriers. In the PDCCH monitoring carrier, the UE should monitor DCI format 1A and 1 for the first carrier and DCI format 1A and 2A for the second carrier, respectively.

In this case, one approach would be to not apply any additional padding bits to the DCIs. Instead, separate blind decoding is performed for different DCI format sizes. In this case, the CIF may not be required because the UE may be able to implicitly determine the carrier information via the successful decoding of a given DCI format size.

The baseline for comparison in the embodiments is the case where each downlink carrier contains its own PDCCH. That is, the PDCCH on each downlink carrier only contains PDSCH assignments for the same downlink carrier and no CIF is used. For normal transmission purposes, a UE may search for two DCI formats in each of sixteen possible PDCCH candidates in the UE-specific search space and six PDCCH candidates in the common search space (for each subframe that the UE is monitoring). These facts results in a maximum of 44 blind decodes per carrier. For the multi-carrier situation where each downlink carrier contains its own PDCCH, the UE would perform a maximum of 44N blind decodes, where N is the number of currently active carriers. Performing this many blind decodes may be undesirable.

For the situation where a PDCCH on one carrier can refer to the PDSCH on a different carrier, it would be desirable to reduce the maximum number of blind decodes that must be performed by the UE below this baseline number of 44N.

Table 1 through Table 4, below, contain the bit lengths of all of the DCIs for different bandwidths, and also for the cases of FDD versus TDD, and two transmission antennas at the eNB versus 4 transmission antennas. DCIs 0, 1A, and 3/3A may always have the same length for a given carrier configuration. The lengths of DCIs 1B, 1D, 2, and 2A vary, in part, based on the number of transmission antennas in use at the eNB.

TABLE 1

DCI format sizes in LTE Release-8. This table relates to FDD with two transmission antennas at the eNB.

| DCI Format | 1.4 MHz | 3 MHz | 5 MHz | 10 MHz | 15 MHz | 20 MHz |
|---|---|---|---|---|---|---|
| 0/1A/3/3A | 21 | 22 | 25 | 27 | 27 | 28 |
| 1 | 19 | 23 | 27 | 31 | 33 | 39 |
| 1B | 22 | 25 | 27 | 28 | 29 | 30 |
| 1C | 8 | 10 | 12 | 13 | 14 | 15 |
| 1D | 22 | 25 | 27 | 28 | 29 | 30 |
| 2 | 31 | 34 | 39 | 43 | 45 | 51 |
| 2A | 28 | 31 | 36 | 41 | 42 | 48 |

TABLE 2

DCI format sizes in LTE Release-8. This table relates to FDD with four transmission antennas at the eNB.

| DCI Format | 1.4 MHz | 3 MHz | 5 MHz | 10 MHz | 15 MHz | 20 MHz |
|---|---|---|---|---|---|---|
| 0/1A/3/3A | 21 | 22 | 25 | 27 | 27 | 28 |
| 1 | 19 | 23 | 27 | 31 | 33 | 39 |
| 1B | 25 | 27 | 28 | 30 | 31 | 33 |
| 1C | 8 | 10 | 12 | 13 | 14 | 15 |
| 1D | 25 | 27 | 28 | 30 | 31 | 33 |
| 2 | 34 | 37 | 42 | 46 | 48 | 54 |
| 2A | 30 | 33 | 38 | 42 | 45 | 50 |

TABLE 3

DCI format sizes in LTE Release-8. This table relates to TDD with two transmission antennas at the eNB.

| DCI Format | 1.4 MHz | 3 MHz | 5 MHz | 10 MHz | 15 MHz | 20 MHz |
|---|---|---|---|---|---|---|
| 0/1A/3/3A | 23 | 25 | 27 | 29 | 30 | 31 |
| 1 | 22 | 26 | 30 | 34 | 36 | 42 |
| 1B | 25 | 27 | 29 | 31 | 33 | 33 |
| 1C | 8 | 10 | 12 | 13 | 14 | 15 |
| 1D | 25 | 27 | 29 | 31 | 33 | 33 |
| 2 | 34 | 37 | 42 | 46 | 48 | 54 |
| 2A | 31 | 34 | 39 | 43 | 45 | 51 |

TABLE 4

DCI format sizes in LTE Release-8. This table relates to TDD, four transmission antennas at the eNB.

| DCI Format | 1.4 MHz | 3 MHz | 5 MHz | 10 MHz | 15 MHz | 20 MHz |
|---|---|---|---|---|---|---|
| 0/1A/3/3A | 23 | 25 | 27 | 29 | 30 | 31 |
| 1 | 22 | 26 | 30 | 34 | 36 | 42 |
| 1B | 27 | 29 | 31 | 33 | 34 | 35 |
| 1C | 8 | 10 | 12 | 13 | 14 | 15 |
| 1D | 27 | 29 | 31 | 33 | 34 | 35 |
| 2 | 37 | 41 | 45 | 49 | 51 | 57 |
| 2A | 33 | 36 | 41 | 45 | 47 | 53 |

PDCCH Blocking Probability

Another issue that has not yet been addressed relates to the increase in blocking probability on the PDCCH. Blocking may occur if the eNB is unable to transmit a control message to the UE in one of several designated CCEs. Blocking may arise, for example, due to other UEs being allocated those CCEs in the same subframe.

With explicit CIF, the UE does not need to monitor the PDCCH from all carriers which may allocate PDSCH or PUSCH. So, it is likely that the eNB configures a set of PDCCH monitoring carriers and this set may be a subset of the downlink or uplink component carriers. In this case, a larger number of PDCCHs, relative to Release-8, may be transmitted on one carrier to a given UE. This fact results in an increased blocking probability, if the PDCCH search space is not also increased.

Other Work on Reducing the Number of Blind Decodings

To address the issue of different carriers having different DCI format sizes, it has been proposed to insert padding bits in the DCI format having a smaller size such that the DCI format becomes the same size as another DCI format size. However, while this particular padding method reduces the required amount of blind decoding, this particular padding method requires additional resources in terms of transmission power or time-frequency resources to transmit the redundant padding bits. That is, in order to obtain the same transmission error rate when comparing an unpadded DCI against a padded DCI (with a larger number of information bits, of which some will be redundant padding bits), greater transmission power or more time-frequency resources must be used for the latter case.

Unrecognized Issues

It should be noted that there is no limitation in terms of carrier bandwidth when carrier aggregation is supported, so different carriers may have different bandwidths, resulting in further variation of DCI format sizes. In addition, it has not been previously recognized that there is a possibility of having different transmission modes for each carrier. Consequently, a wide range of DCI formats may be needed to support the multi-carrier operation.

Tables 1 to 4, above, show the DCI format size with respect to the system bandwidth and transmission mode. In one example, a 1.4 MHz carrier and a 20 MHz carrier may be aggregated, and a DCI format 1 is transmitted for the 1.4 MHz carrier and a DCI format 2A is transmitted for the 20 MHz carrier. In this case, the padding bits to make the 1.4 MHz DCI 1 equal in length to the 20 MHz DCI 2A equals 29 bits. However, this padding is larger than the actual Release-8 DCI format 1 that would be transmitted for a non-aggregated 1.4 MHz carrier.

The embodiments described herein provide solutions whereby, for example, the padding method is applied only when the padding bit size is reasonably acceptable. The embodiments described herein are in addition to and different than the use of padding described above. Specifically, the embodiments provide for various solutions for reducing blind decodings when the explicit CI bits are included in the DCI format to indicate the carrier where the PDSCH/PUSCH is transmitted.

In one embodiment, the size of DCI formats presented as examples herein does not include a size of CIF, so the size of DCI formats is the same as the size of DCI formats in LTE Release-8. The reason is because the length of CIF has not been decided from 1 to 3 bits and there is also a possibility of semi-statically configuring different CIF lengths. When carrier aggregation has been activated, an equal-length CIF may be added to each DCI transmitted. However, adding the equal-length CIF does not necessarily mean that all DCIs increase by the length of CIF. As shown further below, if and when the CIF replaces the Release-8 padding bits that may be added to avoid ambiguous DCI sizes, the actual increase in some DCI format sizes for carrier aggregation can be less than the length of CIF. Even in this case, all of the same-sized DCI formats will increase by the same amount, which might be the length of the CIF field.

Applying Padding in DCI Formats Using Compact Resource Allocation

Figure 4:
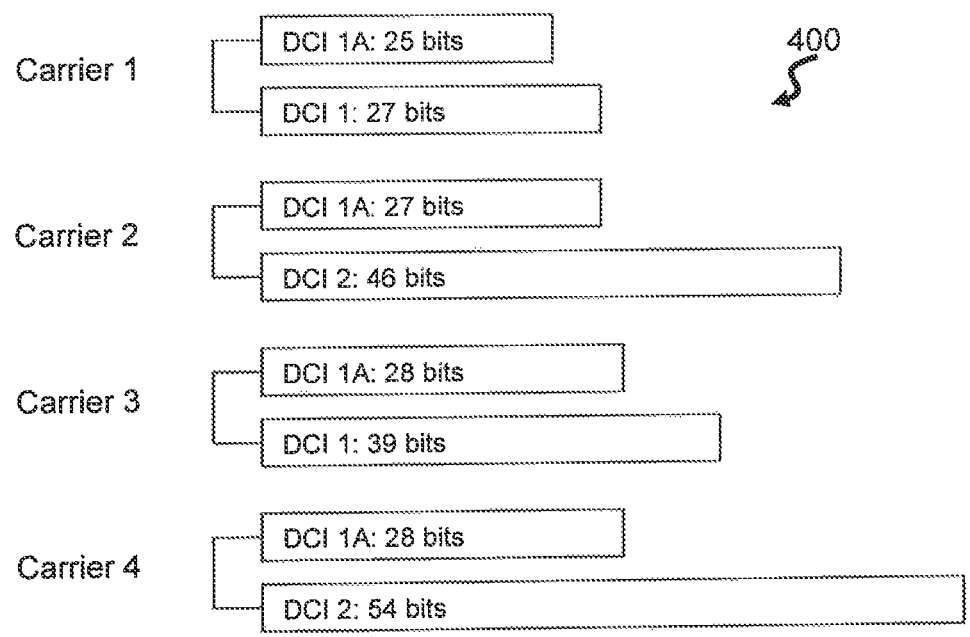
FIG. 4 is a diagram illustrating an example of DCI (Downlink Control Information) formats used in each carrier, in accordance with an embodiment of the disclosure.
Figure 5:
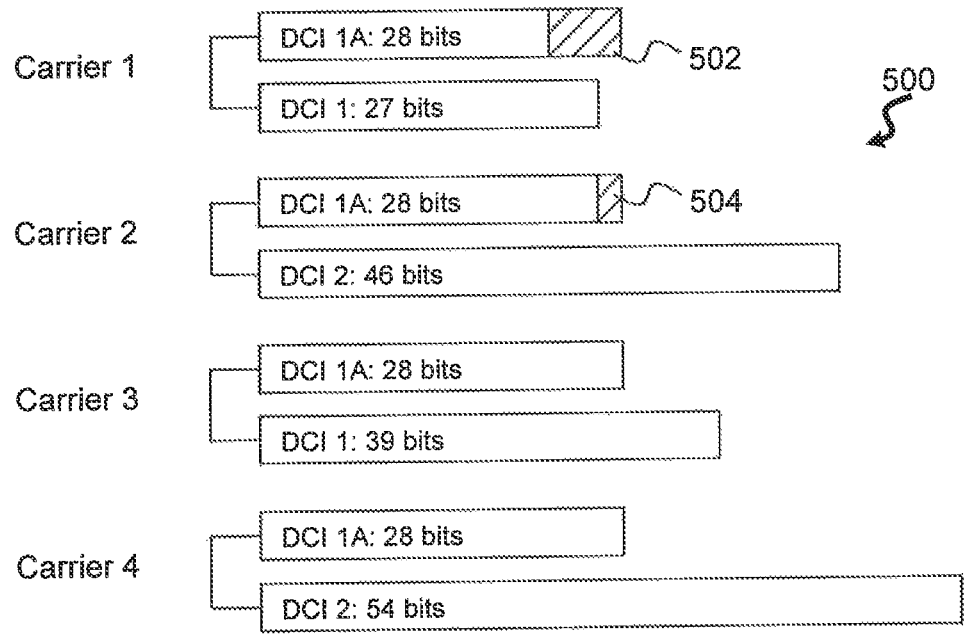
FIG. 5 is a diagram illustrating an example of DCI formats used in each carrier after applying padding bits, in accordance with an embodiment of the disclosure.

FIG. 4 is a diagram illustrating an example of DCI formats used in each carrier, in accordance with an embodiment of the disclosure. FIG. 5 is a diagram illustrating an example of DCI formats used in each carrier after applying padding bits, in accordance with an embodiment of the disclosure. FIGS. 4 and 5 refer to the same set of four carriers, carrier set 400 and carrier set 500. With respect to FIGS. 4 and 5, some methods are provided to create a reasonable padding bit size while minimizing the amount of blind decoding when the carriers are aggregated with the different DCI format size.

In one embodiment, the padding method might be applied only to a certain type of DCI format to avoid an excessively large number of padding bits. One possible way of selecting these types of DCI formats is whether compact resource allocation is used in a particular DCI format. In other words, padding might only be applied in DCI formats using compact resource allocation.

In one embodiment, referring to some DCI formats such as DCI Formats 0 or 1A in Table 1 through Table 4, above, DCI format size does not significantly increase as a function of system bandwidth. In contrast, DCI formats such as DCI format 1 require a significantly larger size as the system bandwidth is increased. The main difference is the resource allocation method.

Briefly, there are two kinds of resource allocation methods in LTE Release-8. One kind of resource allocation uses a bitmap based resource allocation, in which each bit is used to indicate whether the corresponding resource block group is allocated or not. This technique means the required bits for the resource allocation increase linearly with the number of resource block groups. Note that the size of a resource block group also increases with the system bandwidth. Hence, the number of required bits for indicating the resource allocation may not increase completely linearly as a function of the number of resource blocks (i.e. the system bandwidth).

The other resource allocation method is compact resource allocation, in which the starting point and the number of resource blocks are indicated. In this case, the resource allocation bit size increases in a log scale of the number of resource block, which is less sensitive to the number of resource blocks for the corresponding system bandwidth. The bitmap based resource allocation has more flexibility to allocate the RBs than the compact resource allocation. In 3GPP TS 36.213 v8.8.0, the resource type allocation type 0 and the resource allocation type 1 apply the BITMAP based resource allocation, and the resource type 2 applies the compact resource allocation method.

In an embodiment, padding may be applied if the DCI format uses compact resource allocation (DCI formats 0, 1A, 1B, 1C, 1D, 3 and 3A). It is noted that DCIs 3 and 3A may not use the compact resource allocation, but may be padded to the same length as DCIs that do use the compact resource allocation (i.e. DCIs 0 and 1A). For the remaining DCI formats, the DCI format is transmitted without modification. Transmission without modification results in the UE performing blind decoding for each DCI format size. Note that DCI format 1C might not be used to schedule PDSCH in the multiple carriers, because this format might only be used to schedule the PDSCH for the broadcast information (e.g. system information, paging). Hence, even if carrier aggregation has been enabled, one embodiment would be for DCI format 1C to continue to be used without a CIF field necessarily being included.

As an example, there may be 4 carriers having different system bandwidths and transmission modes as shown in Table 5 and FIG. 4. Two DCI formats are allowed for the downlink scheduling in each transmission mode. The different information bit sizes mean that different decodings might be used to detect the DCI format information, which increases the total number of blind decodings. Without any padding, the number of blind decodings would be 6M, where there are six unique DCI format sizes contained in Table 5 and M is the number of PDCCH candidates in which a DCI format can be transmitted within the PDCCH search space.

TABLE 5

Example of carrier aggregation:

| | Carrier | | | |
|---|---|---|---|---|
| | 1 | 2 | 3 | 4 |
| BW | 5 MHz | 10 MHz | 20 MHz | 20 MHz |
| Tx mode | 2 | 4 | 2 | 4 |
| DCI format | 1A | 1A | 1A | 1A |
| Info size | 25 | 27 | 28 | 28 |
| DCI format | 1 | 2 | 1 | 2 |
| Info size | 27 | 46 | 39 | 54 |

For example, M is 16 in the UE-specific search space for LTE Release-8 systems because there are 16 PDCCH candidates in this search space. However, in an embodiment, if the padding is applied to all DCI formats, such that each of the two DCIs for each carrier is padded to one of two possible total lengths with the same two total lengths being used across all carriers, then the total maximum number of blind decodings can be reduced to 2M. This number is the same as LTE Release-8 system where 2 different DCI format sizes are used for each transmission mode. Note that two different DCI lengths might be required in order to allow the UE to differentiate between two different DCIs. In the embodiment shown, the maximum number of padding bits is 27 bits, which might be considered excessive and a waste of system resources.

FIG. 5 shows the DCI formats when the method described above is applied. Because DCI format 1A uses the compact resource allocation method, padding is applied to DCI format 1A, as shown at blocks 502 and 504. The maximum size of DCI format 1A is 28 bits, which is used in carrier 3 and carrier 4. So, padding bits are included in DCI format 1A of the remaining carriers (i.e. carrier 1 and carrier 2) to bring the total number of bits to 28. The maximum number of blind decodings in this case is 5M because there are 5 unique DCI format sizes to be searched for, which is smaller than the originally expected value of 6M.

In the case of DCI 1 and DCI 2 for which padding is not applied, a CIF may not be included because the UE may be able to implicitly detect the carrier information via the successful decoding of a given DCI format size. In FIG. 5, padding is applied to particular DCI formats corresponding to each carrier so that all of the DCIs of a particular format (or with a particular format size) have the same size as the largest DCI with the same DCI format (e.g. DCI format 1A) across all of the carriers. In another embodiment, padding is applied to all DCI formats using the compact resource allocation (across all carriers referenced by the same PDCCH) so that these DCI formats have the same size as the largest DCI among the DCIs in that group of DCIs (i.e. DCIs which use the compact resource allocation).

For example, when the UE receives DCI format 1A and DCI format 1B and the size of DCI format 1A is smaller than DCI format 1B, padding is applied to the DCI format 1A so that it has the same length as the DCI format 1B. In this case, a new type indicator field (for example 1 bit to indicate among the two original unpadded DCI format sizes corresponding to a transmission mode) might be required to let the UE determine whether the received DCI is DCI format 1A or DCI format 1B.

Signaling of the Reference Size

FIG. 6 is a diagram illustrating an example of DCI formats used in each carrier, in accordance with an embodiment of the disclosure. FIG. 7 is a diagram illustrating an example of DCI formats used in each carrier, in accordance with an embodiment of the disclosure. FIGS. 6 and 7 refer to the same set of four carriers, carrier set 600 and carrier set 700.

In an embodiment, the eNB may signal one or more reference sizes, which are used to determine the number of padding bits, following a pre-defined or semi-statically configured padding rules, for example, minimizing the padding bits. When the UE receives the reference sizes, the UE applies the padding for the DCI format having a smaller bit size to increase it so that it has the same size as one of the reference sizes. The exact reference size can be indicated or the carrier index and the DCI format can be signaled, and the UE knows the reference size of the DCI format of the given carrier.

FIG. 6 shows an example based on the same configuration described in Table 5, above. In this embodiment, 28 bits and 39 bits are used as the reference sizes, and the padding is applied for the same type of DCI format. Because DCI formats 1A in carrier 1 and 2 have a smaller size, their size is increased as a result of padding to the reference size, as shown at blocks 602 and 606. In DCI format 1, the reference size is selected as 39 bits. So, DCI format 1 in carrier 1 is increased to 39 bits in which case 12 bits are inserted as padding bits (block 604). Note that DCI 2, carriers 2 and 4, is not padded in this example, because the reference size for the DCI 2 is not configured. In the case of DCI 2, a CIF may not be required because the UE may be able to implicitly detect the carrier information via the successful decoding of a given DCI format size. Finally, the overall maximum number of blind decodings is 4M, as opposed to 6M, because there are 4 unique DCI format sizes.

In another embodiment, signaling a reference size can be applied among the different DCI formats, as shown in FIG. 7 at blocks 702, 704, and 706. In this case, only 28 bits is configured as the reference size. So, DCI format 1 in carrier 1 can also include 1 bit as a padding bit (block 704), unlike the previous example, because the reference size 28 bits is also applied to DCI format 1 in addition to DCI format 1A. The number of blind decodings in this case is also 4M but the maximum number of padding bits is 3 bits.

This example is more efficient than when the padding is applied between the same DCI formats resulting in 12 padding bits (block 604 in FIG. 6). However, when padding is applied for the different DCI formats, the different DCI formats of same carrier can have a same DCI format size. In this example, the padded sizes of DCI format 1A and DCI format 1 in carrier 1 are the same. In this case, a new type indicator field (for example 1 bit to indicate among the two DCI format sizes corresponding to a transmission mode) might be required to let the UE know which DCI format is transmitted with the same carrier indicator.

It may be possible to reuse one of the padding bits, which would normally be set to zero, for this purpose. In the example of FIG. 7, a potential ambiguity might exist between DCI 1A and DCI 1 for Carrier 1. However, both of these DCIs contain at least one padding bit, so a padding bit could be reserved in this instance to act as a type indicator. This technique would mean that the DCI lengths might not need to be further increased.

In an alternative embodiment, the following approach could be used. First, the eNB may signal one or more reference sizes. These reference sizes may or may not be linked to a specific DCI format. Note that multiple reference sizes could be signaled for a particular DCI format.

For each DCI that is being transmitted or searched for, the eNB may pad to the next higher reference size in order to reduce the padding bits. If no next higher reference size exists, that is if the length of the DCI is higher than the highest reference length that has been signaled to the UE, then no padding occurs.

On the UE side, a similar padding procedure as at the eNB may be applied to remove or ignore the padding bits. Thus the UE and the eNB may have a common understanding on the padding. This padding rule could be pre-configured or semi-statically signaled from the eNB to the UE.

This approach can be used for all DCIs with different resource block allocation approaches. This approach may be especially useful for padding signaling DCIs that do not use the compact resource block allocation approach (especially DCIs 1, 2, 2A) in order to potentially reduce the total number of different DCI format sizes that the UE must search for while still avoiding padding a particular DCI with an excessive number of padding bits.

Using an Implicit Method

Figure 8:
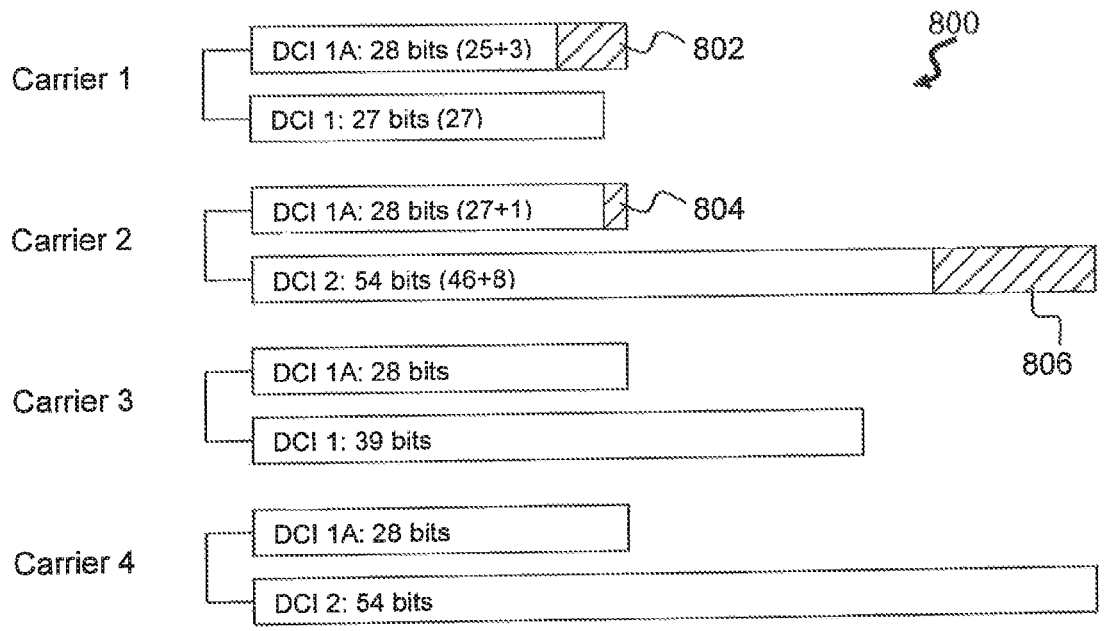
FIG. 8 is a diagram illustrating an example of DCI formats used in each carrier after applying padding bits, in accordance with an embodiment of the disclosure.

FIG. 8 is a diagram illustrating an example of DCI formats used in each carrier. A set 800 of four carriers is shown.

In yet another embodiment, the UE may determine the reference size of each DCI format based on an implicit rule. One possible rule is that the reference size is the largest DCI format size among the DCI formats of which the padding bit difference is smaller than a threshold. This threshold may be specified as either an absolute value (for example 10 bits) or a relative percentage (for example 20%). For the latter case, if a 20% percentage threshold is used and the DCI in question normally has a length of 25 bits (for example DCI 1A for 5 MHz FDD), then it is allowable for up to five padding bits (20% of 25) to be added to that DCI.

Other rules are possible. For example, an implicit rule may be specified by the standards or may be signaled to the UE initially.

One example algorithm of using an implicit rule is given below. In this particular embodiment only, an absolute threshold of 10 bits is used and finding the reference size is performed in the same DCI format. Other thresholds may be used.

In a first step, the UE may check DCI format 1A in carriers 1, 2, 3 and 4. The UE checks the difference between DCI format 1A sizes starting from the smallest size. Because the difference between the DCI format 1A size of carrier 1 and the remaining carriers is smaller than a threshold, all carriers may be included in the same group. In the group, the largest one may be the reference one. The UE may check the difference between DCI format size of the DCI format 1As not included in the previous group. In this example, there are no remaining carriers, so the UE may stop checking.

In a second step, the UE may check DCI format 1 in carrier 1 and carrier 3. The difference is larger than 10 bits. Therefore, padding is not applied. Consequently, separate blind decoding for each DCI format size may be used. In this case, a CIF may not be required because the UE may be able to implicitly detect the carrier information via the successful decoding of a given DCI format size.

In a third step, the UE may check DCI format 2 in carriers 2 and 4. The difference is 8 bits, which is smaller than 10 bits. Therefore, the DCI formats are included in the same group, and the reference size is 54 bits.

FIG. 8 shows the DCI format sizes for each carrier after the padding bits are included, in accordance with an embodiment of the disclosure. DCI formats 1A in carrier 1, 2, 3, and 4 each have a length of 27 bits, and DCI formats 2 in carriers 2 and 3 have a length of 54 bits. For carriers 1 and 2, the DCI format 1A is padded to be set at 28 bits (blocks 802 and 804), which is equal to the DCI format 1A length in carriers 3 and 4. The DCI format 2 in carrier 2 is set to 54 bits (block 806), which is the same as the DCI format 2 in carrier 4. As a result of this method, the overall maximum number of blind decodings is 4M, as opposed to 6M.

In another embodiment, this implicit method can also be applied for the different DCI formats. As mentioned with regard to the signaling the reference size method described above, the different DCI formats of the same carrier can have the same DCI format size. In this case, the type indicator might be required to let the UE know which DCI format is transmitted with the same carrier indicator.

In an alternative embodiment, a hybrid technique may be used wherein signaling the reference size and an implicit rule are used. In this embodiment, if the eNB signals the reference sizes, the signaling of the reference size method is applied; otherwise, the implicit rule method described above is applied. The parameters used by implicit rule may be signaled to the UE initially.

UE Specific Search Space

Figure 9:
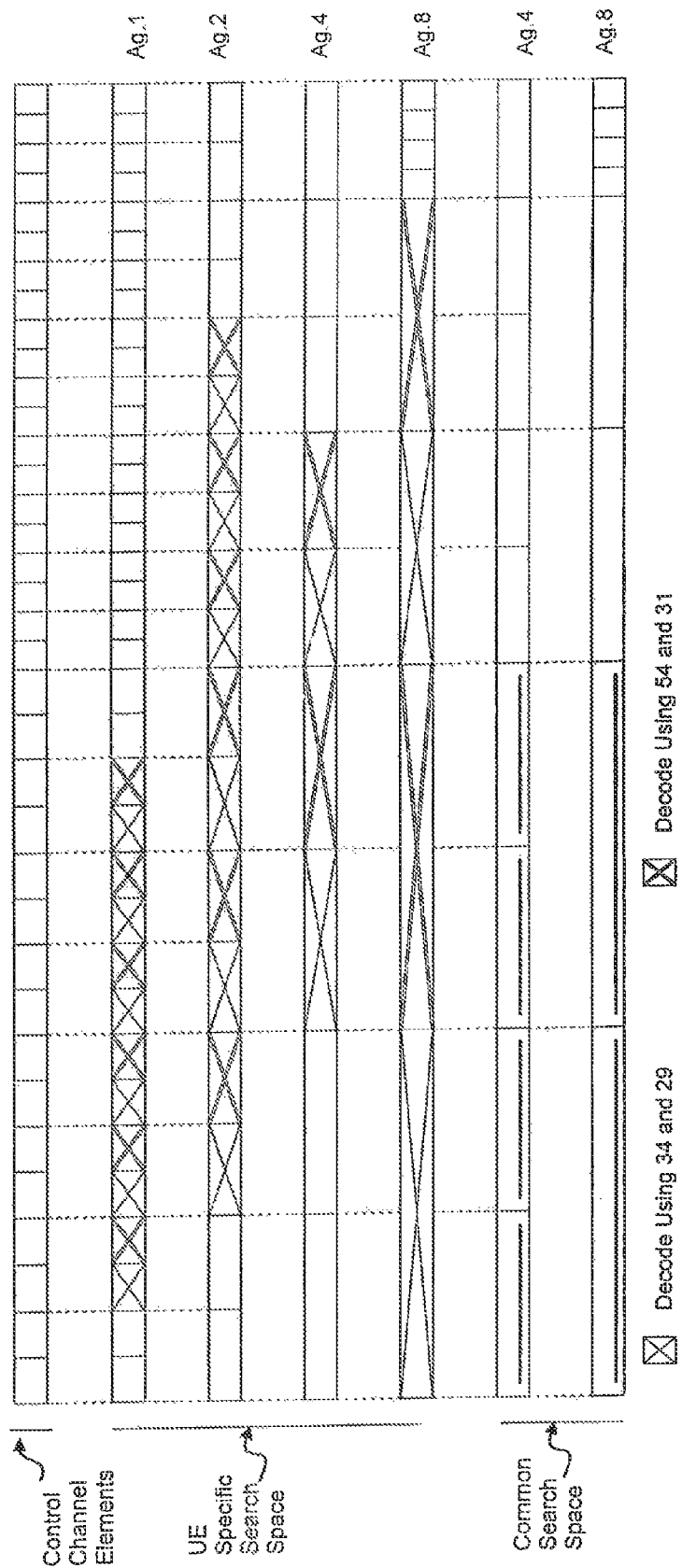
FIG. 9 is a diagram showing control channel elements and defining UE specific search spaces therein, in accordance with an embodiment of the disclosure.

FIG. 9 is a diagram showing control channel elements (CCE) and defining UE specific search spaces therein, in accordance with an embodiment of the disclosure. CCE blocks align with each other, as shown. Decoding using different DCI format sizes (number of bits) is shown as either "X" or double-lined "X", depending on which scheme is to be used. The symbol "Ag" in FIG. 9 always refers to the term "Aggregation Level"; thus, "Ag.1" refers to "Aggregation Level 1."

FIG. 9 represents one embodiment for reducing the blocking probability without increasing the maximum number of blind decodings. The technique shown in FIG. 9 may also be used to avoid padding between different DCI format sizes. To accomplish this technique, the eNB may establish separate search spaces for each set of DCI format sizes which correspond to one or more carriers. This embodiment reduces the blocking probability by increasing the UE specific search space in an UE. Multiple search spaces may be defined for the UE to receive the PDCCH. However, it does not increase the number of blind decodings because separate UE specific search spaces are assigned for the different DCI format sizes which already require separate blind decoding. Effectively, it has a smaller number of blind decodings than the case when the PDCCHs are transmitted in the same carrier in which PDSCH/PUSCH is transmitted.

For example, consider a case where the UE is assigned two carriers, which share a single PDCCH monitoring carrier. Consider further that carrier f1 is a 10 MHz carrier using transmission mode 1 and carrier f2 is a 20 MHz carrier using transmission mode 4. Using Release-8 DCI formats, and without the use of any padding technique as described above, the UE would need to decode DCI formats of size 34 and 29 bits for carrier f1 and 54 and 31 bits for carrier f2. This result essentially increases the blind decoding by a factor of 2, from 2M to 4M. Further, the size of the search space (M) will likely have to be extended to accommodate carrier aggregation to maintain the same blocking probability as Release-8, so the actual increase in blind decoding will be from 2M to 4M', where M' is likely on the order of 2M, which is twice as large.

However, particular PDCCH candidates may be associated with particular DCI formats. In this manner, each PDCCH candidate may only be blind decoded using two DCI format sizes, as illustrated in FIG. 9, which shows an example of a UE specific search space.

In FIG. 9, it can be seen that the PDCCH candidates may be divided among the potential DCI format sizes in alternating fashion. Because each candidate is associated with a particular set of DCI formats, the only increase in blind decoding, relative to Release-8, is due to the increased search space. Blind decoding might be increased from 2M in Release-8 to 2M' relative to Release-10, where M is the size of the search space in Release-8 and M' is the size of the search space for carrier aggregation in Release-10.

Figure 10:
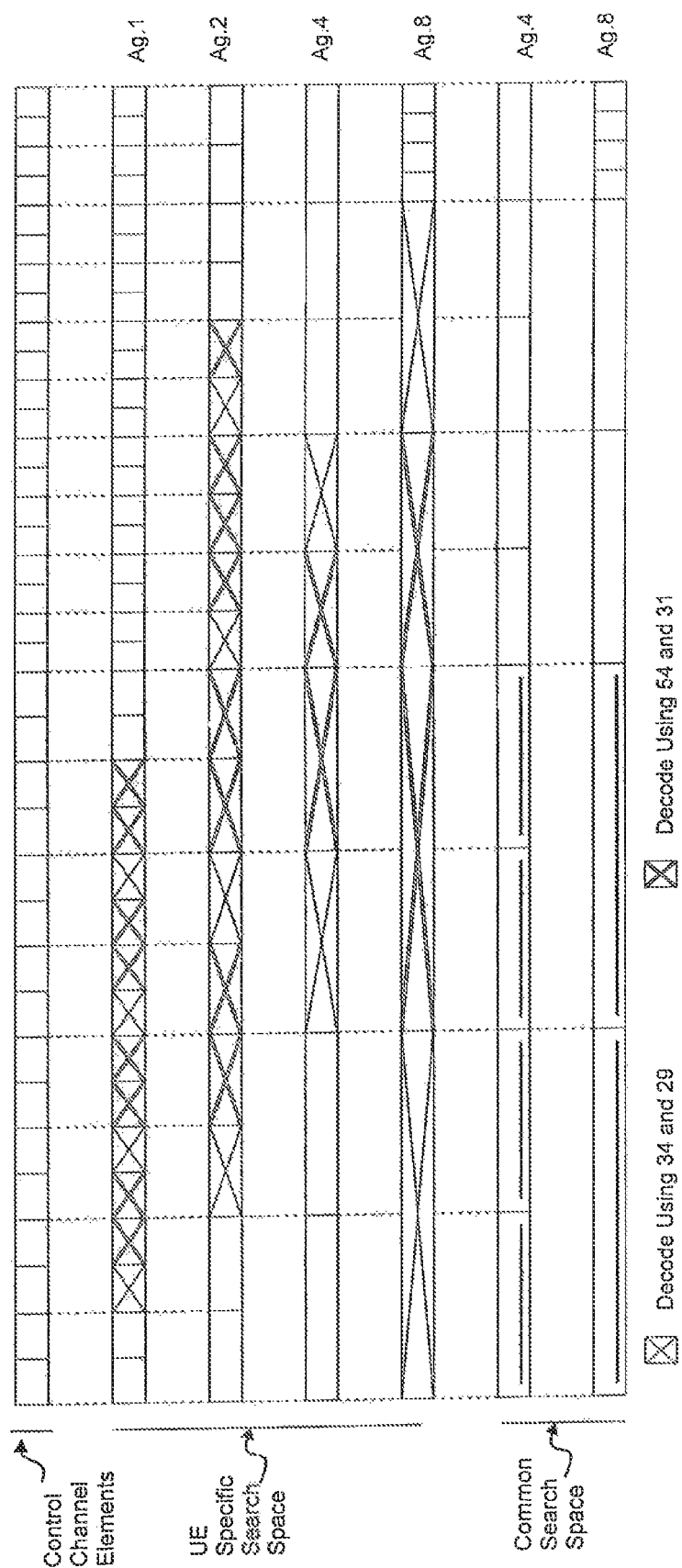
FIG. 10 is a diagram showing control channel elements and defining UE specific search spaces therein, in accordance with an embodiment of the disclosure.

FIG. 10 is a diagram showing control channel elements and defining UE specific search spaces therein, in accordance with an embodiment of the disclosure. CCE blocks align with each other, as shown. Decoding using different DCI formats (number of bits) is shown as either "X" or double-lined "X", depending on which scheme is to be used. The symbol "Ag" in FIG. 9 always refers to the term "Aggregation Level;" thus, "Ag.1" refers to "Aggregation Level 1."

The embodiment described with respect to FIG. 9 may be extended to more than two carriers. For example, if there is a third carrier, f3, which is 20 MHz using transmission mode 4, then the above decoding scheme could be used or more candidates could be dedicated to decoding 54 and 31. This implementation is shown in FIG. 10.

Figure 11:
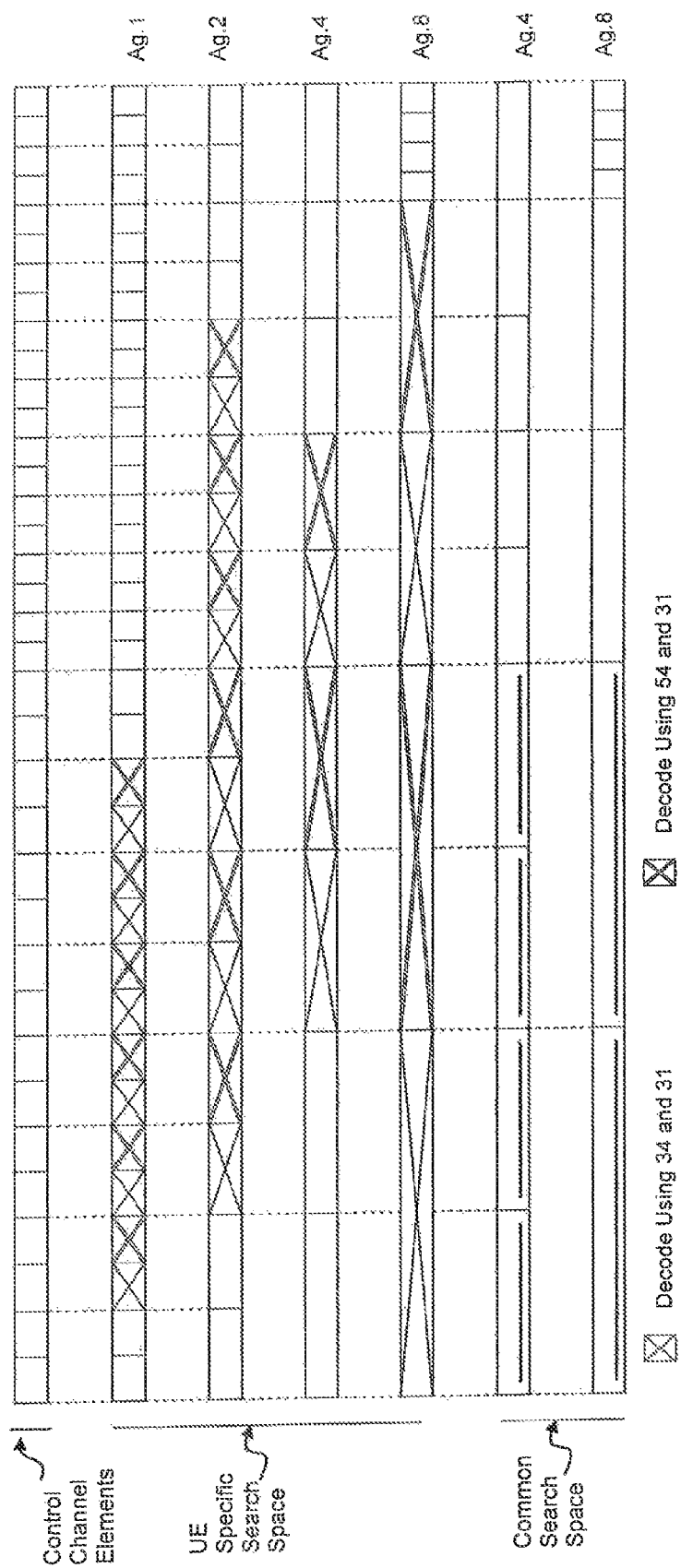
FIG. 11 is a diagram showing control channel elements and defining UE specific search spaces therein, in accordance with an embodiment of the disclosure.

FIG. 11 is a diagram showing control channel elements and defining UE specific search spaces therein, in accordance with an embodiment of the disclosure. CCE blocks align with each other, as shown. Decoding using different DCI formats (number of bits) is shown as either "X" or double-lined "X", depending on which scheme is to be used.

In some embodiments, the embodiment described with respect to FIG. 11 may be combined with one of the padding solutions described above. When two DCI formats are close enough in size that padding will not sufficiently hinder system performance, the smaller DCI format may be padded so that its size equals the larger DCI format. Such an example is illustrated in FIG. 11. The term "not sufficiently hinder" may be quantified by the use of a predetermined or otherwise configured threshold that measures system performance.

Specifically, as shown in FIG. 11, the DCI formats for the 29 bits case are padded to 31 bits. Thus, any PDCCH candidate may be used to allocate resources for any carrier using a DCI format size of 31 bits. In some other embodiments, particular PDCCH candidates may also be associated with particular reference sizes, which may be explicitly or implicitly signaled.

Figure 12:
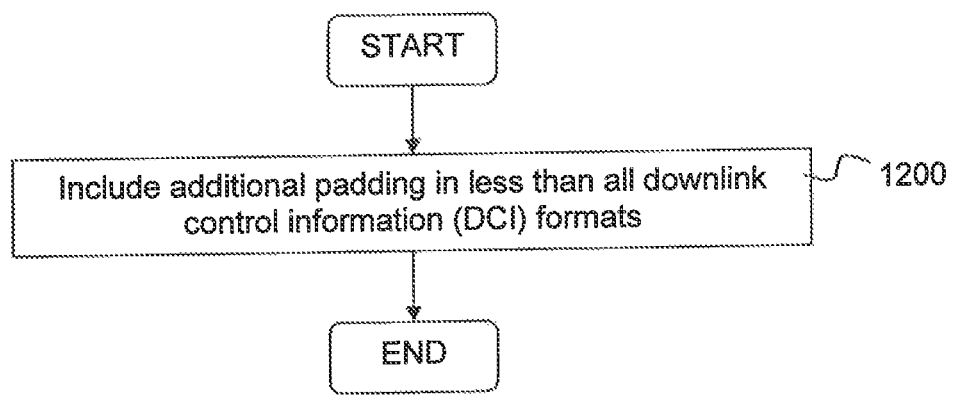
FIG. 12 is a flowchart illustrating a method for reducing a number of blind decodings when carrier aggregation is used, in accordance with an embodiment of the disclosure.

FIG. 12 is a flowchart illustrating a method for reducing a number of blind decodings when carrier aggregation is used, in accordance with an embodiment of the disclosure. The method shown in FIG. 12 may be implemented in a UE (or a network access device) or an eNB, such as those shown in FIG. 1. The method shown in FIG. 12 may be implemented using a processor and/or other components, such as those shown in FIG. 13. The method shown in FIG. 12 reflects one or more embodiments as described with respect to FIGS. 2 through 11, and the method shown in FIG. 12 may be expanded and/or modified according to the embodiments described elsewhere herein.

The method begins as the device includes additional padding in less than all downlink control information (DCI) formats (block 1200). The process terminates thereafter.

In some embodiments, the device includes padding in less than all DCI formats when the UE is configured for carrier aggregation with at least two of the carriers having different system bandwidths. In some embodiments, the device includes padding in less than all DCI formats when the UE is configured for carrier aggregation with at least two of the carriers corresponding to different transmission modes and the different bandwidths.

Figure 13:
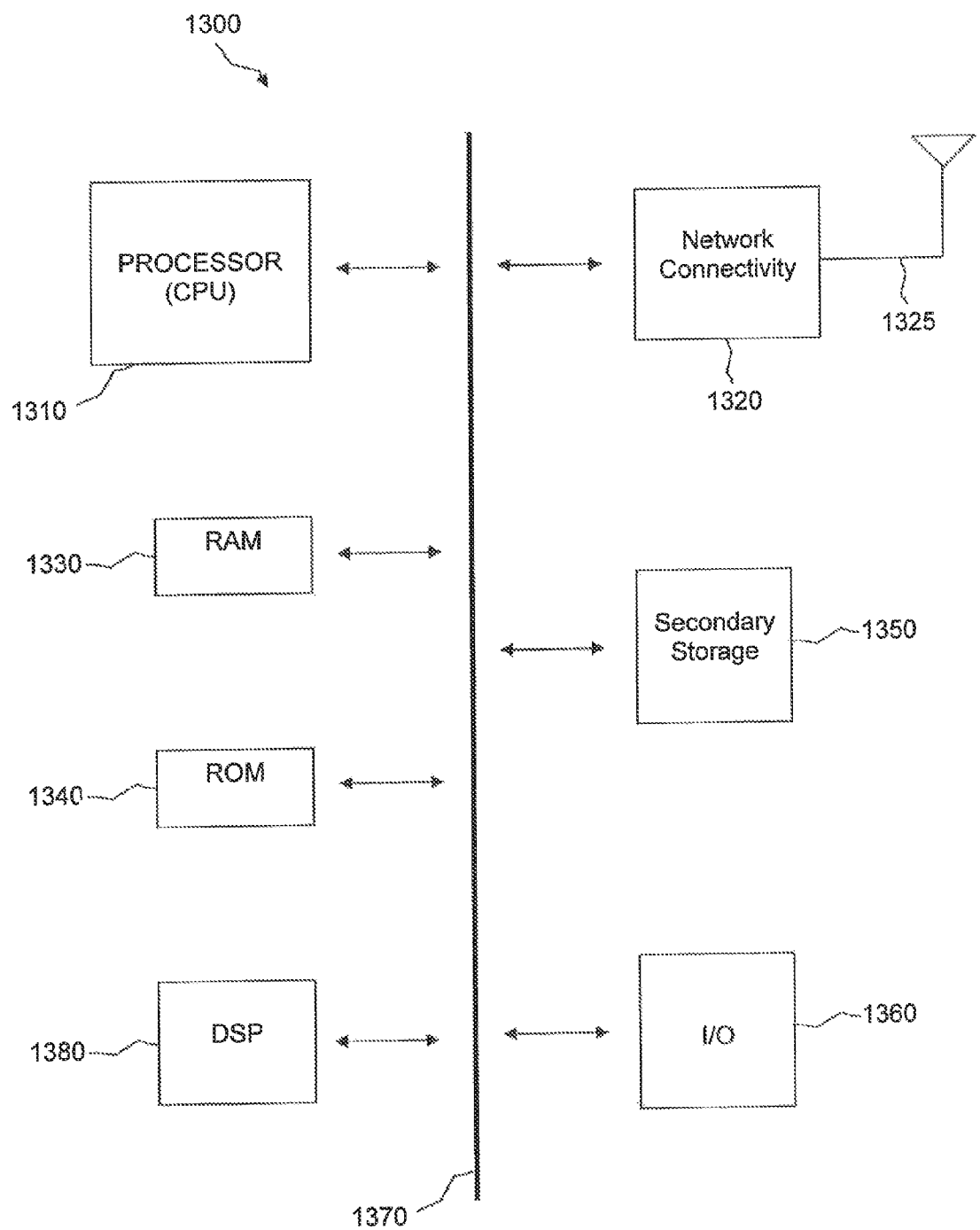
FIG. 13 illustrates a processor and related components suitable for implementing the several embodiments of the present disclosure.

The UE and other components described above might include processing and other components that alone or in combination are capable of executing instructions or otherwise able to promote the occurrence of the actions described above. FIG. 13 illustrates an example of a system 1300 that includes a processing component, such as processor 1310, suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

The following documents are hereby incorporated by reference in their entireties:

R1-093699, "Way Forward on PDCCH for Bandwidth Extension in LTE-A", Alcatel-Lucent et al.

R1-093465, "Component carrier indication scheme for carrier aggregation", Panasonic.

3GPP TS (technical specification) 36.814.

3GPP TS (technical specification) 36.212 v. 8.7.0.

3GPP TS (technical specification) 36.213 v. 8.8.0.

U.S. Provisional Patent Application 61/187,070, "System and Method for Sharing a Control Channel for Carrier Aggregation."

Thus, the embodiments provide for a method for reducing a number of blind decodings to be performed when carrier aggregation is being used. Padding is included in less than all downlink control information (DCI) formats. The embodiments may be implemented in a UE, an access node, or possibly both together as a system. Either a UE or an access node may be embodied as a processor configured to perform the embodiments described herein.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for transmitting downlink control information when carrier aggregation is being used, the method comprising:
    determining at least one downlink control information (DCI) format for a first carrier and at least one format for a second carrier;
    including padding in at least one DCI format corresponding to the first carrier or the second carrier such that the DCI format size of the padded DCI format equals a reference size, wherein padding is only included in DCI formats that use a compact resource allocation method; and
    transmitting DCI formats that do not user the compact resource allocation method without padding.

2. The method of claim 1, wherein the references size is the size of the DCI format size corresponding to the first carrier.

3. The method of claim 1, wherein the at least one DCI format of the first carrier and the at least one DCI format of the second carrier correspond to different transmission modes or different carrier bandwidths.

4. The method of claim 1, further comprising:
    encoding information corresponding to the padded DCI format; and
    transmitting a DCI with the encoded information to a user equipment (UE).

5. The method of claim 1, wherein the only DCI formats in which padding is including have a type 2 resource allocation.

6. The method of claim 1, wherein the DCI formats that use the compact resource allocation method comprise DCI formats 0, 1A, 1B, 1C, 1D, 3, and 3A, and wherein the DCI formats that are transmitted without padding comprise DCI formats 1, 2, and 2A.

7. The method of claim 5, wherein the DCI formats that are transmitted without padding having a type 0 or a type 1 resource allocation.

8. The method of claim 1, further comprising signaling a reference size for use in determining a number of padding bits to be used for one or more DCI formats.

9. The method of claim 8, wherein the reference size is signaled by an indicator that indicates the reference size.

10. The method of claim 1, further comprising determining based on a rule a reference size of each of a plurality of downlink control information (DCI) formats.

11. The method of claim 10, wherein the rule includes selecting a reference DCI format size as being the largest DCI format size among a plurality of DCI formats for which the padding bit difference is smaller than a threshold.

12. The method of claim 11, wherein the threshold comprises one of an absolute value of a number of bits or a relative percentage of size difference.

13. The method of claim 10, wherein the rule is signaled by an access device.

14. An access device for transmitting downlink control information when carrier aggregation is being used, the access device comprising:
    a processor configured to:
    determine at least one downlink control information (DCI) format for a first carrier and at least once DCI format for a second carrier;
    include padding in at least one DCI format corresponding to the first carrier or the second carrier such that the DCI format size of the padded DCI format equals a reference size, wherein the component includes padding only in DCI formats that use a compact resource allocation method; and transmit DCI formats that do not user the compact resource allocation method without padding.

15. The access device of claim 14, wherein the reference size is the size of DCI format size corresponding to the first carrier.

16. The access device of claim 14, wherein the at least one DCI format of the first carrier and the at least one DCI format of the second carrier correspond to different transmission modes or different carrier bandwidths.

17. The access device of claim 14, wherein the processor is further configured to:

encode information corresponding to the padded DCI format; and transmit DCI with the encoded information to a user equipment (UE).

18. The access device of claim 14, wherein the only DCI formats that use the compact resource allocation method comprise DCI formats 0, 1A, 1B, 1C, 1D, 3, and 3A.

19. The access device of claim 18, wherein the DCI formats in which padding is included have a type 2 resource allocation, and wherein the DCI formats that do not use the compact resource allocation method have a type 0 or type 1 resource allocation.

20. The access device of claim 14, wherein the component is further configured to apply padding to a plurality of DCI formats that use the compact resource allocation method such that DCI formats for each carrier are padded to one of two possible total lengths, with the same two possible total lengths being used across all carriers.

21. The access device of claim 14, wherein the component is further configured to signal a reference size for use in determining of a number of padding bits to be used for one or more DCI formats.

22. The access device of claim 21, wherein the reference size is signaled by an indicator that indicates the reference size.

23. A user equipment (UE), comprising:

a component configured to:

determine at least one downlink control information (DCI) format for a first carrier and at least one DCI format for a second carrier;

determine an amount of padding bits in at least one DCI format corresponding to the first carrier or the second carrier such that the DCI format size of the padded DCI format equals a reference size, wherein the component determines the reference size based on an implicit rule if the at least one DCI format does not use a compact resource allocation method.

24. The UE of claim 23, wherein the reference size is the size of DCI format size corresponding to the first carrier.

25. The UE of claim 23, wherein the at least one DCI format of the first carrier and the at least one DCI format of the second carrier correspond to different transmission modes or different carrier bandwidths.

26. The UE of claim 23, wherein the component is further configured to:

decode DCI based on the determined padded DCI format size.

27. The UE of claim 23, wherein the component is further configured to determine reference sizes based on rule for each of a plurality of downlink control information (DCI) formats that do not use the compact resource allocation method.

28. The UE of claim 27, wherein the component uses the implicit rule to determine a reference size for each of the DCI formats comprising one of DCI formats 1, 2, and 2A.

29. The UE of claim 23, wherein the implicit rule includes selecting a reference DCI format size as being the largest DCI format size among a plurality of DCI formats for which a padding bit difference is smaller than a threshold, and wherein the threshold comprises one of an absolute value of a number of bits or a relative percentage of size difference.

* * * * *